June 26, 1956   W. J. BRENDEL ET AL   2,752,137
CARBONATING APPARATUS
Filed March 27, 1953
Fig. 1.
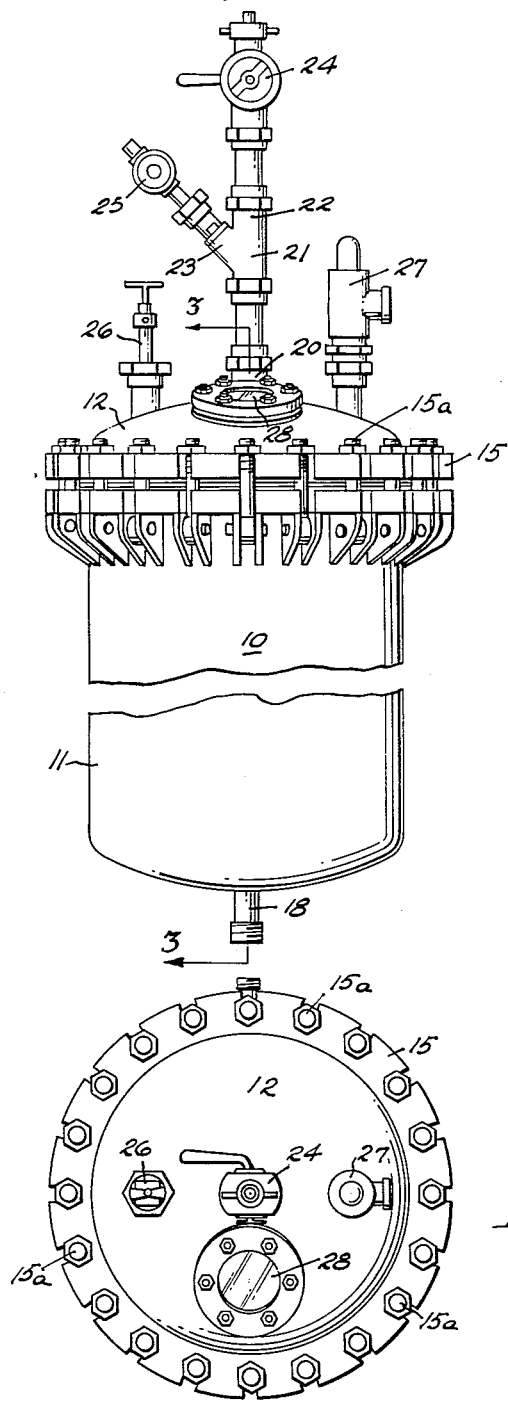
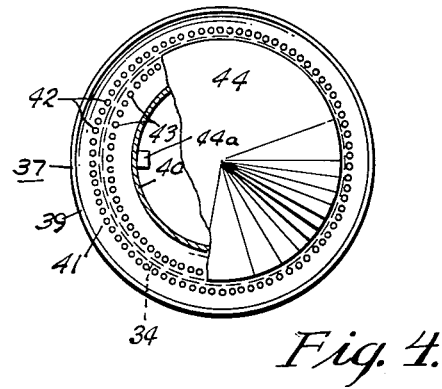
Fig. 4.
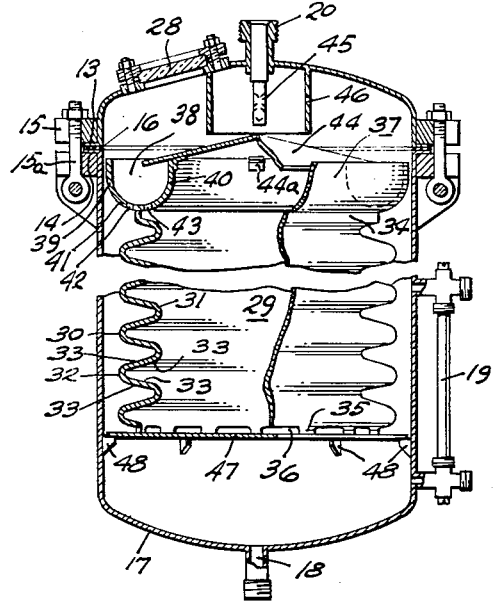
Fig. 3.
Fig. 2.
INVENTORS.
WILLIAM J. BRENDEL
BY JOSEPH S. SCHAPIRO
Attorney

# United States Patent Office 2,752,137
Patented June 26, 1956

2,752,137

CARBONATING APPARATUS

William J. Brendel, Ellicott City, Md., and Joseph S. Schapiro, Beverly Hills, Calif., assignors to Sparkle Beverages, Inc., Ellicott City, Md., a corporation of Maryland Application March 27, 1953, Serial No. 345,202

3 Claims. (Cl. 261—112)

This invention relates to carbonated liquids and is more particularly concerned with improved apparatus for producing carbonated milk beverages.

A principal object of the present invention is to provide such an apparatus which, for a given capacity, is relatively compact.

Another object of the present invention is to provide such an apparatus which is exceedingly simple in design and construction and which is comparatively simple and inexpensive to manufacture.

Other objects and advantages of the present invention will appear more fully hereinafter, it being understood that said invention consists substantially in the combination, construction, location and general arrangement of parts, all as described in detail in the following specification, as shown in the accompanying drawings and as finally pointed out in the appended claims.

In the accompanying drawings, which are illustrative of a preferred construction embodying the principles of the present invention:

Figure 1 is an elevational view of the carbonating apparatus;

Figure 2 is a top plan view thereof;

Figure 3 is a vertical sectional view thereof taken on line 3—3 of Figure 1; and Figure 4 is a top plan view of the internal milk-receiving distributor.

Referring to the drawing, the apparatus of the present invention includes a closed metal vessel or container 10 designed and equipped to operate as a pressure chamber in which the milk and carbonating gas are to be mixed. The container 10 is formed of two main separable parts, namely, a cylindrical body member 11 and a dome-shaped top member 12, these members being respectively provided with complementally formed annular flanges 13 and 14 detachably clamped together by suitable means including a clamping ring 15 and bolts 15a. A suitable gasket 16 disposed between the flanges 13 and 14 forms an hermetic seal therebetween. The body member 11 is provided with a bottom wall 17 dished to direct the carbonated milk toward a discharge outlet 18 suitably fitted therein at the low point thereof. It will be understood that a suitable valve (not shown) is secured to the outlet 18 for controlling the discharge of the carbonated liquid from the container 10. Preferably, the body member 11 is conventionally provided with a liquid level indicator 19.

The dome-shaped top member 12 is centrally provided with an inlet fitting 20 to which is detachably secured a standard type of dairy fitting 21 having divergent branches 22 and 23 for respective connection with conduits leading to suitable sources of supply of the milk to be carbonated and of the carbon dioxide gas for carbonating the milk. A suitable control valve 24 is included in the milk supply conduit connected to the milk inlet branch 22, while a separate control valve 25 is included in the gas supply line connected to the gas inlet branch 23. Preferably, the top member 12 of the container 10 is additionally provided with a standard air release valve 26, with a standard pressure relief valve 27 and with an observation window 28.

Adapted for removable disposition interiorly of the container 10, as shown in Figure 3, is a cylindrical member 29 of hollow construction having oppositely facing exterior and interior surfaces 30 and 31, respectively. The member 29 preferably is made of sheet metal and is corrugated so as to provide a series of vertically spaced similar annular elements 32, each such element being formed both exteriorly and interiorly with oppositely inclined upper and lower surfaces 33—33. The member 29 terminates at its opposite ends in axially extending oppositely facing annular portions 34 and 35, the lower one 35 of which is provided with circumferentially spaced open notches 36.

Disposed over the member 29 and positioned in concentric relation thereto is an annulus 37 provided with an annular channel 38 having exterior and interior upright side walls 39 and 40, respectively, and base wall 41. The latter is provided with an outer series 42 and an inner series 43 of concentrically arranged perforations, the perforations of each series being closely spaced and the base wall 41 being supported upon the upwardly facing annular portion 34 of the member 29 and conventionally rigidly secured thereto so as to position the outer series of perforations 42 outwardly of, and the inner series of perforations 43 inwardly of, the annular portion 34 of the member 29.

Supported upon the interior upright side wall 40 of the annular channel 38 is a sheet metal apron 44 in the form of a cone the apex of which presents upwardly and the base of which overhangs the wall 40. The apron 44 is secured against displacement by a plurality of clips 44a proximate the base thereof spaced circumferentially thereabout on the underside thereof and abutting the wall 40.

The inlet fitting 20 of the dome-shaped top member 12 is provided with means for introducing into the container 10 the liquid to be carbonated, the aforementioned means being in the form of a nozzle 45 which is similar to the one disclosed in the United States Patent 2,563,390, issued August 7, 1951, to which reference may be had for a detailed description of its construction and operation. It should be noted here, however, that the nozzle 45 is disposed over the apron 44 in coaxial spaced relation thereto. Depending from the dome-shaped top member 12 in concentric relation to the nozzle 45 in spaced relation to the apron 44 is a cylindrical baffle member 46. The apron 44 and the annulus 37 are disposed in crowning relation to the cylindrical member 29, and all three of the aforementioned members are supported upon an imperforate circular plate 47 which is smaller in diameter than the inside of the body member 11 and which is loosely seated upon a plurality of lugs 48 which project inwardly from the body member 11 of the container 10.

In operation of the apparatus, the milk to be carbonated is pumped under suitable pressure into the container 10 simultaneously as the carbonating gas is injected into the container 10. Inasmuch as the milk and gas are intially introduced to each other in the inlet fitting 20, the milk discharged from the nozzle 45 preliminarily is charged with a certain amount of the gas. However, the amount of gas so initially absorbed by the milk is insufficient to cause any frothing thereof. The flared hollow stream of milk and gas discharged from the nozzle 45, as described in the patent referred to hereinabove, impinges upon the baffle member 46 and then drops to the apron 44, or impinges directly upon the apron 44, and then flows outwardly and downwardly thereover into the annular channel 38 from whence it is gently discharged by way of the perforations 42 in the base wall 41 upon the exterior surface 30 of the member 29 and by way of the perforations 43 upon the interior surface 31 of the member 29. The milk so discharged upon the oppositely facing corrugated surfaces 30 and 31 of the member 29 flows downwardly by the force of gravity in contact with the aforementioned surfaces in the form of thin films.

It will be apparent, of course, that the interior of the container 10 is filled with carbon dioxide gas under the pressure thereof as supplied to the container 10 and that during the course of its gravity flow downwardly over the corrugated surfaces 30 and 31 of the member 29 the milk in the form of thin films uniformly absorbs the gas in large amounts, the gas absorptive capacity of the milk being very measurably increased by reason of the fact that the thin films of milk provide such increase in surface area as renders it capable of entraining the carbonating gas in maximum amount. As the milk courses downwardly over the corrugated surfaces of the member 29 it continues to absorb the carbonating gas so that when the milk reaches the bottom of the member 29 it is fully and completely charged with carbonating gas. Upon reaching the bottom of the member 29 the milk flows over the plate 47 and passes through the space between the periphery of the plate 47 and the inside of the body member 11, dropping into the bottom of the container 10, from whence it is drawn off through the discharge outlet 18.

It is, of course, apparent that the apparatus of the present invention is designed to be operated continuously for as long a period as may be desired, the period of the production run depending upon the supply of milk available for carbonation. In any case, the milk and gas is continuously injected into the apparatus for continuous discharge therefrom in the form of carbonated milk ready to be bottled or otherwise dispensed, the flow of milk through the apparatus being at such rate as not to build up any appreciable volume of carbonated milk within the container 10. If desired, suitable controls (not shown) actuated by the level of the liquid in the container 10 may be employed to interrupt injection of the milk and gas into the container from their respective sources of supply automatically should the level of the carbonated milk rise above the plate 47, thereby insuring that the member 29 provides maximum area of flow surface for the milk to be carbonated.

It will be understood, of course, that while the apparatus of the present invention is especially adapted for use in the production of carbonated milk beverages, it is equally well adapted for carbonating other beverage liquids, such as fruit juices, bottling syrups, water and the like.

The apparatus of the present invention is, for a given capacity, relatively compact, this feature being a consequence, firstly, of the cylindrical shape of the member 29, secondly, of the utilization of the interior surface of the member 29, as well as the exterior surface thereof, and, thirdly, of the utilization of the apron 44, all of which factors contribute to concentrate within a small space the surface area over which the milk courses while absorbing the carbonating gas.

The apparatus of the present invention is simple in design and construction and comparatively simple and inexpensive to make, this feature being a consequence, firstly, of the fact that certain parts, for example, the member 29, may be made of a variety of materials, for example, a metal or a suitable plastic, and, secondly, of the fact that the member 29 may be fabricated from sheet material instead of cast, or even from a blank seamless pipe or tubular section.

It will be understood, of course, that the apparatus as herein shown and described is susceptible of various changes and modifications which may be made from time to time without involving any departure from the general principles or real spirit of the present invention, and it is accordingly intended to claim the same broadly, as well as specifically, as indicated in the appended claims.

What is claimed as new and useful is:

1. In an apparatus for producing a carbonated beverage, a vessel adapted to be charged with a carbonating gas at super-atmospheric pressure, a single nozzle unit affording an exclusive inlet to the top of said vessel for a liquid to be carbonated by said gas, an upright cylindrical member in said vessel under said nozzle, means disposed in crowning relation to said upright member for receiving said liquid from said nozzle for distribution thereof for gravity flow downwardly in contact with the internal and external oppositely facing surfaces of said upright member in the form of thin films which provide ample surface area for effectively entraining in a maximum amount said gas in said liquid, said distributing means including an apron under said nozzle having an upwardly presenting conically shaped flow surface sloping downwardly and outwardly from the discharge end of said nozzle, a baffle member for concentrating the discharge from said nozzle upon the central portion of the apron flow surface and diverting the same from a substantial remaining marginal portion of the apron flow surface, and an annulus provided with an annular channel for receiving said liquid from said apron, after the same has flowed in a thin film outwardly from said central flow surface portion over the said marginal flow surface portion for initially entraining some of said gas in said liquid, the base wall of said channel being provided with closely circumferentially spaced perforations some of which are disposed interiorly of, and some of which are disposed exteriorly of, said upright member for passage of said liquid therethrough and for distribution thereof as aforesaid, and means for drawing off from said vessel said liquid and entrained gas.

2. In an apparatus for producing a carbonated beverage, a vessel adapted to be charged with a carbonating gas at superatmospheric pressure, a single nozzle unit affording an exclusive inlet to the top of said vessel for a liquid to be carbonated by said gas, an upright cylindrical member in said vessel under said nozzle, means disposed in crowning relation to said upright member for receiving said liquid from said nozzle for distribution thereof for gravity flow downwardly in contact with the internal and external oppositely facing surfaces of said upright member in the form of thin films which provide ample surface area for effectively entraining in a maximum amount said gas in said liquid, said distributing means including an apron under said nozzle having an upwardly presenting flow surface upon the central portion of which the discharge from said nozzle is concentrated, and an annulus provided with an annular channel for receiving said liquid from said apron after the same has flowed in a thin outwardly from said central flow surface portion over the remaining marginal flow surface portion of substantial area for intitial entrainment of some of said gas in said liquid, the base wall of said channel being perforated for discharging said liquid and for distributing the same over said upright member as aforesaid.

3. In an apparatus for producing a carbonated beverage, a vessel adapted to be charged with a carbonating gas at superatmospheric pressure, exclusively singular means for introducing into said vessel when charged as aforesaid a liquid to be carbonated by said gas, an upright member in said vessel, means disposed in crowning relation to said upright member for receiving said liquid from said introducing means for distribution thereof for gravity flow downwardly in contact with the surfaces of said upright member in the form of thin films which provide ample surface area for effectively entraining in a maximum amount said gas in said liquid, said distributing means including an apron having an upwardly presenting flow surface upon a portion of which the discharge from said introducing means is concentrated, and a member in the form of a channel for receiving said liquid from said apron after the same has flowed in a thin film from said flow surface portion upon which said discharge is concentrated over the remaining flow surface portion of substantial area for intitial entrainment of some of said gas in said liquid, the base wall of said channel being provided with discharge openings for distributing said liquid over said upright member as aforesaid.

References Cited in the file of this patent

UNITED STATES PATENTS

| | | |
|---|---|---|
| 2,563,390 | Brendel et al. | Aug. 7, 1951 |

FOREIGN PATENTS

| | | |
|---|---|---|
| 9,255 | Germany | May 31, 1880 |
| 17,328 of 1896 | Great Britain | Sept. 5, 1896 |
| 551,574 | Great Britain | Mar. 1, 1943 |